Patented Apr. 29, 1941

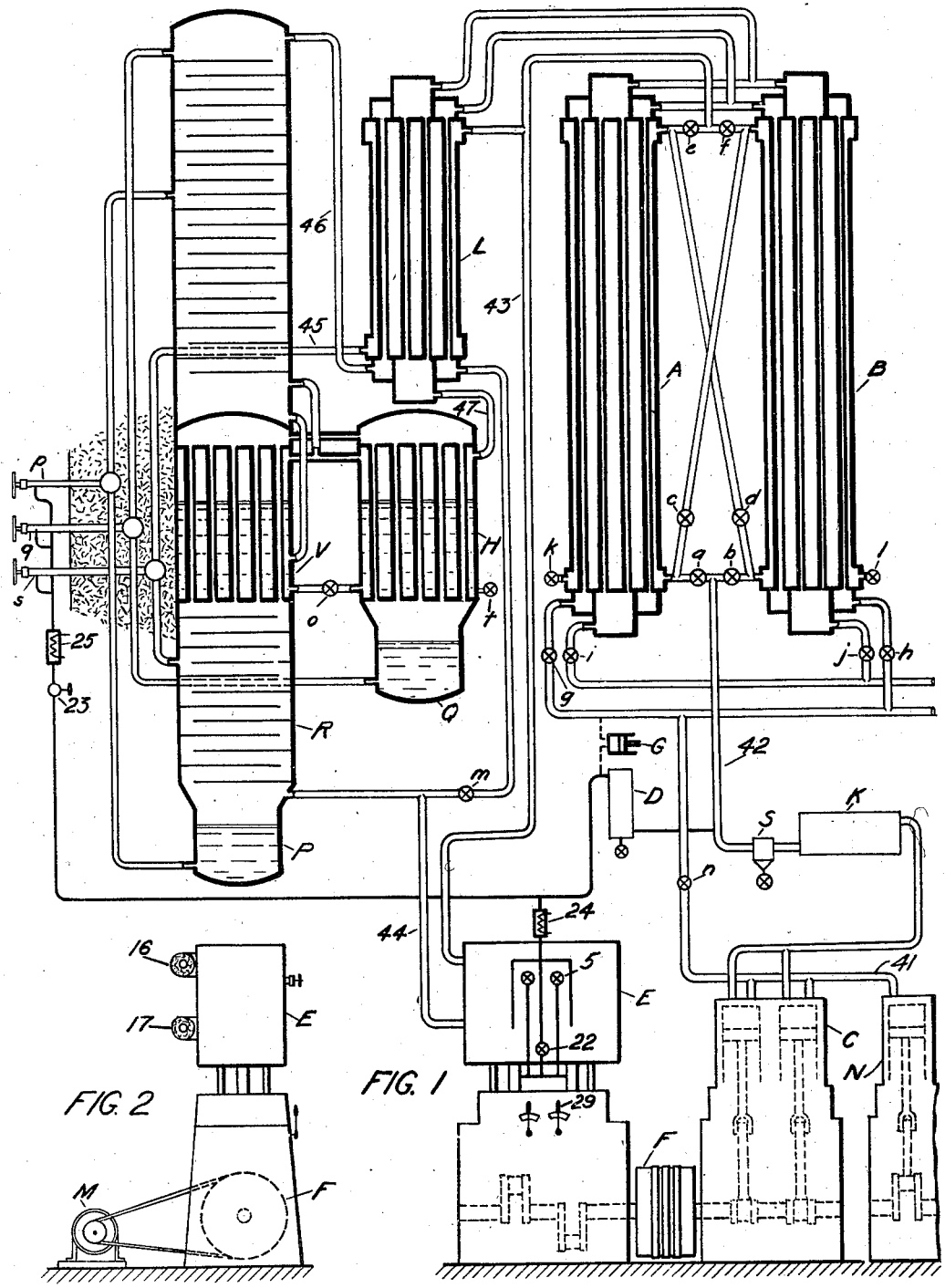

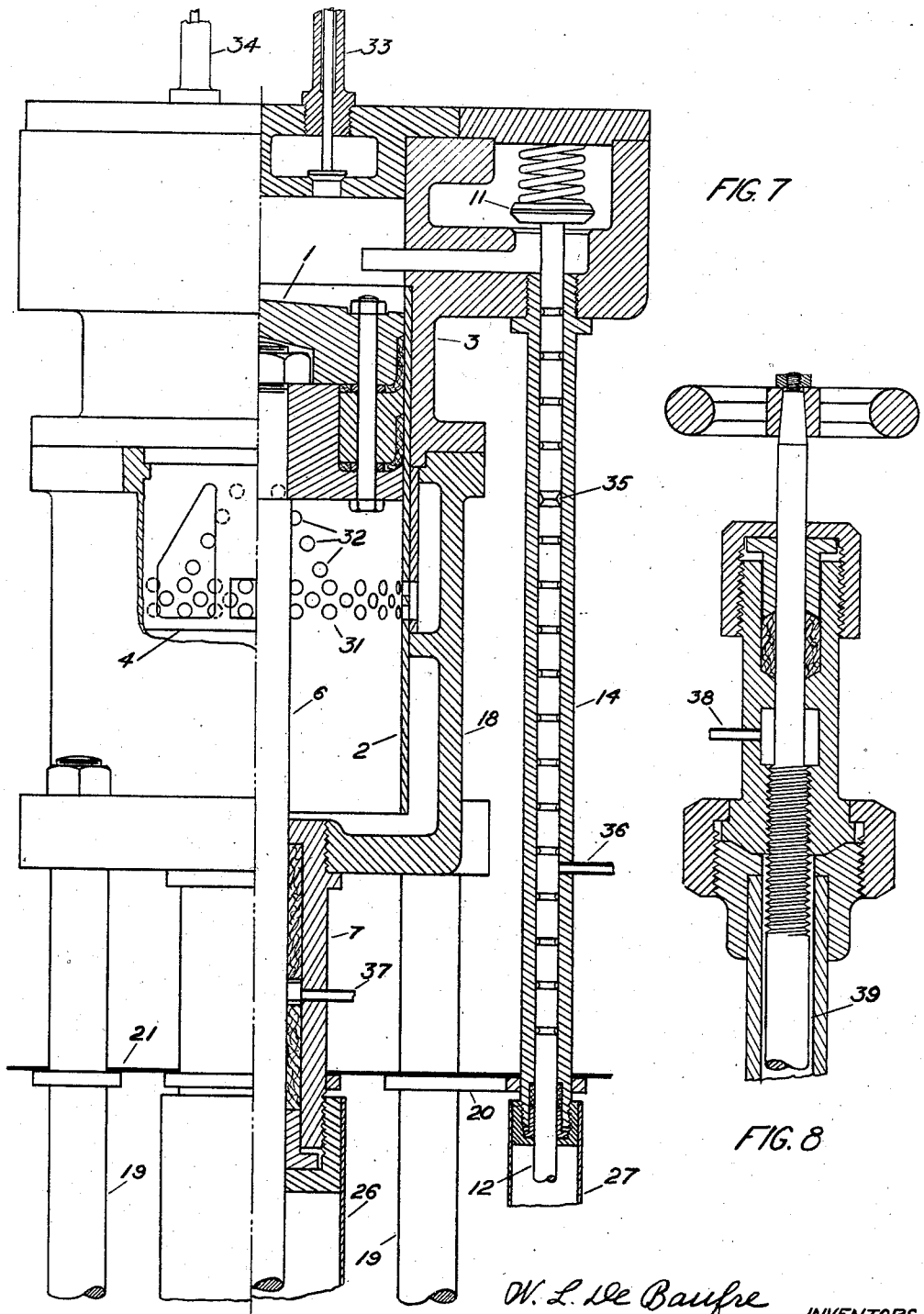

2,239,883

UNITED STATES PATENT OFFICE 2,239,883

EXPANSION ENGINE

William Lane De Baufre and Theodore Anton Filipi, Lincoln, Nebr.; said Filipi assignor to said De Baufre Original application March 4, 1936, Serial No. 67,108. Divided and this application June 30, 1937, Serial No. 151,198

18 Claims. (Cl. 62—123)

The present application is a division of application Serial No. 67,108, filed March 4, 1936.

This invention relates to expansion engines for gas liquefaction plants where the primary purpose is removal of heat from the fluid expanded in the engine and recovery of mechanical power produced thereby is secondary. The compressor-expander-motor unit described herein is of particular application in large plants for cooling and rectifying air in order to produce oxygen in quantity at low cost for gas making and metallurgical uses but the unit and even the engine only may also be used in other gas liquefaction processes.

In expanding compressed air or other gas from a given initial pressure to a specified exhaust pressure, a certain amount of heat may be removed therefrom per unit weight of the fluid by adiabatic expansion. In an actual engine or turbine, expansion is not adiabatic, so that less heat is removed than theoretically possible. One object of the present invention is to increase the ratio of the heat actually removed to that theoretically possible to remove by adiabatic expansion, as compared with expansion engines and turbines used heretofore in air separation plants. Another object of the invention is to recover mechanical power produced by the expansion and utilize this power in compressing the fluid to be expanded. The compressor-expander-motor unit described may be used in an external refrigeration cycle, but it is particularly adapted for boosting the pressure in the single-cycle process described in U. S. Patent 2,128,692, issued August 30, 1938.

Another object of the invention is to produce a more nearly uniform flow of fluid into and particularly out of the expansion engine in order to reduce fluctuations in flow, especially within the rectifier where such fluctuations adversely affect the operation of the plant. Other objects of the invention include reduction in heat losses due to heat leaks through engine parts and due to losses of cold fluid either before or after expansion. The whole compressor-expander-motor unit and particularly the expansion engine are arranged for efficient connection to the separation unit and for convenient adjustment in combination with the separation unit by the plant operator.

The foregoing together with such other advantages as hereinafter appear or are incident to the invention are realized by the construction illustrated in preferred form in the drawings, wherein:

Figure 1 is a schematic drawing showing the preferred relation of the compressor-expander-motor unit to the interchangers, liquefier, and rectifier with external exchanger of the separation unit.

Figure 2 is a side view of the compressor-expander-motor unit of Fig. 1 to show the connection of the synchronous motor to the flywheel of the compressor-expander.

Figure 3 is a side view in section of the expansion engine showing the whole mechanism.

Figure 4 is a section through the upper part of the cylinder in Fig. 3 to show the annular passageway from the inlet pipe to the inlet valve. Insulation is omitted.

Figure 5 is a front view partly in section of the expansion engine, showing the multi-cylinders and details of the valve mechanism.

Figure 6 is a section, omitting insulation, through the middle of one cylinder and the lower portion of the other cylinder in Fig. 5.

Figure 7 is an enlarged view partly in section of the cylinder of the expansion engine to show details of the piston rod packing and valve rod sleeve with dry gas admission, the sleeve for controlling compression and release of the fluid expanded, clearance pockets in the engine cylinder, etc.

Figure 8 is a sectional view of the long stem and stuffing box with dry gas admission for valves such as would be used in the clearance pockets of Fig. 7 and in throttling valves $p$, $q$ and $s$ of Fig. 1.

Referring to the several drawings, we have for the compressor-expander-motor unit, the compressor designated by C and the expansion engine designated by E. Flywheel F between compressor C and expander E also serves as a sheave for the belt drive from synchronous motor M. K is an after-cooler for compressor C and excess moisture is removed from the compressed air by mechanical separator S. D is a drier and G is a small gas compressor for purposes to be explained later.

Within the separation unit, A and B are interchangers, L is a liquefier, R is a rectifier and H is an exchanger that functions in combination with the rectifier. The pots at the bottoms of rectifier R and exchanger H are designated by P and Q respectively.

Vaporizer V is placed between the preliminary and final rectification sections of rectifier R, these sections being below and above vaporizer V respectively.

For the process as carried out in the apparatus of Fig. 1, air is compressed from atmospheric pressure by compressors not shown and is then by connecting rod 9 to the crank on main shaft 10. Inlet valve 11 is opened by valve rod 12 projecting upwards from the roller running on the cam on cam-shaft 13. Valve rod 12 projects through the stuffing box at the lower end of sleeve 14. Cam-shaft 13 runs at the same speed as main-shaft 10, although a cam-shaft running at one-half the speed of main-shaft 10 could be used. Bearings for main-shaft 10 and for cam-shaft 13 and guides for cross-head 8 are supported in the base-plate and frame 15, forming a crank-case which is totally inclosed to facilitate lubrication.

Pipe 16 is the inlet pipe for the fluid to be expanded and pipe 17 is the exhaust pipe for expanded fluid. Both pipes 16 and 17 are on the same side of the engine, thus facilitating connection of the expansion engine to the separation unit with short pipes. Inlet valve 11 is on the opposite side of the engine to inlet pipe 16, and annular passageways are provided in head casting 3 for flow of high pressure fluid from pipe 16 to valve 11, as shown in Fig. 4, which is a section through the head casting. By means of this annular passageway, the valve operating mechanism is brought to the front of the engine where it is in a convenient position for adjustment by the operator while the pipe connections remain out of way at the rear of the engine. This passageway also acts as a jacket around the upper part of the cylinder.

Referring to Fig. 5, head castings 3' and 3" for all cylinders are bolted to a common cylinder block 18 supported by standards 19 on crankcase 15. This construction would be used for three or more cylinders as well as for the two cylinders shown. Cylinder liners 2' and 2" project down within cylinder block 18. When piston 1" is at the bottom of its stroke, the space above it within cylinder liner 2" is connected by the ports indicated through cylinder liner 2" to the space within cylinder block 18 including the space within the other cylinder liner 2' below the piston therein which is at the top of its stroke (as indicated by the position of the corresponding crank). The spaces below all pistons are thus joined by passageways in cylinder block 18 to form a reservoir for expanded fluid from each cylinder in turn, thereby tending to make a uniform flow of fluid exhausted from the cylinders to the separation unit.

The annular spaces between the liners 2' and 2" and cylinder block 18 forms a "jacket" around each cylinder liner containing very cold fluid at the temperature of the fluid exhausted from the cylinders. In engines operating above room temperature, cylinder jackets have been applied to maintain the cylinder walls at a high temperature. It is here proposed to apply cylinder jackets to engines operating below room temperature in order to keep the cylinder walls at low temperature. The use of an ordinary uniflow engine cylinder at temperatures below room temperature would provide a short jacket containing very cold fluid and extending longitudinally a distance of not over ten to fifteen per cent of the stroke of the piston. The jacket here proposed extends about forty per cent of the stroke above the top of the piston when the latter is at the bottom of its stroke as shown in the right hand cylinder of Fig. 5. It is believed to be new to use such a cold jacket extending longitudinally one-fifth or more of the stroke of the piston from the face of the piston when at the end of its stroke.

Valve rod sleeves 14' and 14" are braced to standards 19 by support 20. Casing 21 rests upon support 20 and upon collars around other standards 19 and around stuffing boxes 7' and 7" (as shown more clearly in Fig. 7). Casing 21 completely surrounds the cylinders and is filled with insulating material to reduce heat leak into the cylinders from the surrounding atmosphere.

With the engine cylinders at temperatures 150 and more below zero centigrade, heat leaks into the cylinders along all rods extending through the insulation to support the cylinders, to operate the valves, etc. In order to reduce heat leak, these rods are all made of great length and of a metallic composition having relatively low heat conductivity. For example the stuffing box through which piston rod 6 projects, see Fig. 7, has a length from the inner face of the cylinder to the outer face of the cap greater than the stroke of the piston, whereby no point on the piston rod is exposed both to low temperature gas within the cylinder above the stuffing box and to atmospheric air below the stuffing box. The valve rod sleeve 14 is braced to standards 19 rather than to cylinder block 18 in order to minimize heat leak. Sleeve 14 is of great length from support 20 to the point of attachment to the cylinder near valve 11.

There is a tendency for cold fluid to leak out of the system wherever an operating rod passes through the insulation, such as connecting rod 6 which projects through stuffing box 7, valve rod 12 which passes through sleeve 14, the worm axle extending to handwheel 5 for rotating sleeve 4 (see Fig. 6), and also the valve stems of control valves $p$, $q$ and $s$ in Fig. 1. If there are any leaks of fluid out of the system around these operating rods, not only is there a loss of such fluid and of refrigeration therein, but the resultant cooling of the outer parts of these rods and adjacent parts condenses and freezes water vapor thereon from surrounding atmospheric air. The resulting ice accumulating on these rods, interferes with their operation. This is particularly noticeable with connecting and valve rods which have reciprocating motion, the ice adhering to these rods tearing packing material in stuffing boxes and thus rapidly increasing leakage of cold fluid. Even with rotating rods, as in throttle valves, the escaping cold fluid cools and hardens the packing material in the stuffing boxes so that the glands of such boxes cannot be forced in by the caps to compress the packing material and thus stop the leak. When a leak once starts, it generally becomes worse and adversely affects operating conditions until the whole system can be warmed to room temperature and the stuffing boxes repacked with fresh packing material.

To reduce if not entirely eliminate such troubles at these operating rods, it is proposed to supply a dry gas at about atmospheric temperature to intermediate points in stuffing box 7 for connecting rod 6, in sleeve 14 for valve rod 12, and in the tubes surrounding the worm axle to handwheel 5 and surrounding the stems of control valves $p$, $q$ and $s$. It is proposed to supply this dry gas at a pressure sufficient to prevent leakage of cold fluid. Where the cold fluid is at a nearly constant pressure, the warm dry gas should have a slightly higher pressure. Where the cold fluid fluctuates widely in pressure, the warm dry gas should have a pressure higher than the average pressure of the cold fluid but it is not deemed necessary for the warm fluid to exceed the highest pressure of the cold fluid to prevent leakage of the cold fluid. A higher pressure may be used if more convenient.

If any leakage then occurs into the atmosphere, it will be the warm dry gas which will leak out around the operating rod rather than the cold fluid. The packing material in the stuffing box can be compressed to stop such a leak because the packing material will remain soft at nearly atmospheric temperature. Accumulation of ice on the operating rod from condensation of atmospheric moisture will be eliminated so that the packing material around reciprocating rods will not be injured. The methods of applying the warm dry gas are shown more in detail in Fig. 7 and Fig. 8.

Thus, if a form of packing material is used in stuffing box 7 for piston rod 6, that is tighter against leaks in one direction than in the opposite direction, this packing material should be placed in reversed positions on the two sides of the lantern gland shown where the warm dry gas is introduced at 37. This arrangement is indicated by the so-called "C-ring" packing in Fig. 7. The warm gas tends to leak from the lantern gland downwards to the outside end of the stuffing box. It also tends to leak upwards to the inside of the cylinder if its pressure is greater than that of the cold fluid within the cylinder.

In the case of the valve stem and valve rod 12, grooves are turned thereon to form a "labyrinth" packing within the very long sleeve 14. The warm dry gas is supplied to an intermediate point along this sleeve as indicated at 36 in Fig. 7.

For throttle valves, etc., the warm dry gas may be supplied to an annular space between the packing and the threads on the valve stem as shown at 38 in Fig. 8. The dry gas at atmospheric temperature in leaking along the threads on rod 39 will eliminate the danger of the valve becoming inoperative by reason of water freezing or oil congealing in the threads as would be liable to occur with very cold fluid leaking along these threads.

In an air separation plant, there are several sources of warm dry gas for the purpose described. Thus, as shown in Fig. 1, pipe 42 conveying further compressed air to interchangers A and B may be tapped for the small amount of dry gas required. This compressed air will have sufficient pressure for the purpose and will be at about atmospheric temperature; but it must be passed through drier D to remove chemically nearly all water vapor therein. This dry air may be supplied directly to sleeves 14 around the inlet valve rods although a somewhat lower dry air pressure would probably be satisfactory. The pressure should preferably be reduced, however, before supplying this dry air to stuffing boxes 7 for piston rods 6 and to the tubes around the worm axles to handwheels 5, because the pressure of the cold fluid at these points is equal to the exhaust pressure of the engine. Reduction in pressure is accomplished by means of a pressure reducing valve 22. For control valves p, q and s, the dry air pressure should likewise be reduced by means of pressure reducing valve 23. If desired to heat the dry air above room temperature, small heaters 24 and 25 may be employed for the purpose.

Instead of drawing upon a source of compressed air under sufficient pressure for the purpose and then drying the compressed air, it is possible to use nitrogen returning from the separation unit because this nitrogen is almost completely dry by reason of the very low temperature to which it has been subjected in rectifier R. It would be necessary, however, to compress the dry nitrogen by means of a small compressor such as shown at G in Fig. 1, the dotted lines indicating an alternative arrangement.

In Fig. 3, a third source of gas is shown for the expansion engine, namely, the inlet pipe to this engine. The pressure will be sufficiently high for the purpose, and very little moisture will remain in the gas cooled to the low temperature at this point. There will, however, be some loss of refrigeration in withdrawing cold air at this point and heating it to atmospheric temperature.

In any one plant, two or three different sources may be drawn upon for warm dry gas for the purpose described. Individual heaters 23 and 24 may be desirable in order to supply excess heating at some one point where thawing is necessary, such as in the threads on the valve stem in Fig. 8.

Even with long stuffing boxes or sleeves for the connecting and valve rods and a supply of warm dry gas as described, the temperature of the connecting rod and valve rods where they are exposed to atmospheric air may be below the dew point temperature of the surrounding atmosphere. This would result in condensation of atmospheric moisture, and the resulting water would run down along the rods into the crank case where it would mix with lubricating oil. A stuffing box with packing material may be provided for the connecting rod where it enters the crank case, as shown in Fig. 3, in order to prevent such moisture entering the crank case.

Condensation of moisture on the connecting and valve rods is prevented by means of casings 26 and 27 respectively. Leakage of dry gas through the stuffing boxes fills the interior of these casings with moisture free gas so that there can be no condensation on the rods. These casings may be of any construction that will enable them to be easily slipped into place and should ordinarily not be air tight. Should these casings be cooled below the dew point temperature by conduction of heat to the stuffing box caps, the moisture condensed thereon will not run down into the crankcase, but may be drained away by a gutter around the edge of the crank-case. These casings, however, may be made air-tight if provision is made for leakage of the dry air along the rod or otherwise into the crank-case. Also, such casings might be used without a supply of dry warm gas to the rods as described.

It may be noted that instead of the stem of valve 11 projecting entirely through sleeve 14 before it comes into contact with valve rod 12, the valve rod projects up into sleeve 14 and contact between the valve stem and the valve rod occurs at 35 in Fig. 7. By this arrangement, the inertia of valve 11 is reduced and the valve is not liable to stick by tightening the gland on the packing material at the lower end of sleeve 14. The break at contact point 35 also reduces heat leak into the cylinder as compared with a continuous metal valve stem. In fact, there is a gap between the valve rod and the valve stem for considerably more than half the time.

Referring to Fig. 5, cam-shaft 13 is driven by chain drive 28 from main-shaft 10. Mounted on cam-shaft 13 is a series of cams for the inlet valve of each cylinder. Each series of cams may be shifted by means of a lever 29 in order to bring any desired cam into play under the roller of valve rod 12. Three or more of these cams give three or more different points of cut-off for the gas entering each cylinder, thereby enabling three or more different degrees of refrigeration to be obtained with each cylinder. By having individual levers for shifting the series of cams for the inlet valve of each cylinder independent of the inlet valves of the remaining cylinders, a more flexible arrangement is obtained than if all cams were shifted simultaneously by a single lever although this might be desirable in certain cases.

An additional cam is arranged either not to open the inlet valve at all, or to open it but slightly so as to have the cylinder swept out by fresh gas rather than expanding and compressing the same mass of gas over and over again. In either case, by moving lever 29 to shift this cam into play, the cylinder in question does not contribute any refrigeration to the separation unit. By throwing the corresponding cams into play for all cylinders, the whole engine becomes inoperative so far as producing refrigeration is concerned.

Another additional cam 30 is arranged either to hold the inlet valve open at all times or at least to hold it open when the piston is near the bottom of its stroke uncovering exhaust ports through the cylinder liner. This cam is for use in defrosting or drying the interior of the expansion engine cylinder. As described and claimed in U. S. Patent 2,113,680, issued April 12, 1938, the separation unit and expansion engine are defrosted by blowing warm gas into the nitrogen outlet pipe from the separation unit. To dry out the expansion engine, valve m in Fig. 1 should be open so that the warm gas will flow through pipe 44 and thence into pipe 17 of Fig. 3. By means of the cam described, the inlet valve may be opened while the engine shaft is jacked into a position where the piston uncovers the exhaust ports. The warm air then blows in through the exhaust ports, up through the cylinder and out through the inlet valve to remove any moisture from the cylinder. It is only necessary to shift lever 29 in order to open the inlet valve for this purpose.

We claim:

1. An expansion engine for expanding a compressed gas from an initial pressure and a temperature below atmospheric temperature to an exhaust pressure and a still lower temperature, including a crank-connecting rod and valve operating mechanism and a crank case housing the same, multiple cylinders in parallel with reciprocating pistons therein for expanding said gas on one side only of said pistons, a common cylinder block into which said cylinders project, the spaces on the opposite sides of said pistons forming a common reservoir within said cylinder block, standards attached to said crank case and to said cylinder block, supporting said cylinder block at a distance from said crank case, insulation surrounding said multiple cylinders and said cylinder block, piston rods extending from said reciprocating pistons through said insulation to said crank-connecting rod mechanism within said crank case, inlet valves for admitting the compressed gas to said multiple cylinders, rods for opening said inlet valves extending from said inlet valves through said insulation to said operating mechanism within said crank case, ports through the projecting parts of said multiple cylinders uncovered by said pistons for exhausting the expanded gas into said reservoir, inlet pipes extending through said insulation for admitting the compressed gas to said inlet valves, and an exhaust pipe extending from said reservoir through said insulation for exhausting expanded gas from said reservoir, whereby the cold compressed gas expands from the initial pressure to the exhaust pressure in flowing through said multiple cylinders from one end to the other end thereof and exhausts from said expansion engine at a nearly uniform rate.

2. An expansion engine for expanding a compressed gas from an initial pressure and a temperature below atmospheric temperature to an exhaust pressure at a still lower temperature as in claim 1, wherein said multiple cylinders are in a vertical position and said inlet valves are near the top thereof whereby the cold expanding gas flows downward through said cylinders from the top to the bottom thereof.

3. An expansion engine for expanding a compressed gas from an initial pressure and a temperature below atmospheric temperature to an exhaust pressure and a still lower temperature as in claim 1, wherein said inlet pipes are connected to said multiple cylinders on the opposite sides to said inlet valves and are connected to said inlet valves by annular passageways extending around said cylinders, whereby the inlet ends of said cylinders are jacketed by cold compressed gas.

4. An expansion engine for expanding a compressed gas containing moisture from an initial pressure and a temperature below atmospheric temperature to an exhaust pressure and a still lower temperature, said moisture being deposited within said engine, including a cylinder, an exhaust port for exhausting expanded gas from said cylinder, means for closing and opening said exhaust port, an inlet valve for admitting said gas to said cylinder, a series of cams, mechanism for opening and closing said valve by one of said cams, means for shifting the mechanism from one to another of said cams, one of said cams holding said valve open when said exhaust port is open whereby said engine may be defrosted by warm gas flowing through said exhaust port and said inlet valve.

5. An expansion engine for expanding a compressed gas containing moisture from an initial pressure and a temperature below atmospheric temperature to an exhaust pressure and a still lower temperature, said moisture being deposited within said engine, including a cylinder, an exhaust port for exhausting the expanded gas from one end of said cylinder, means for closing and opening said exhaust port, an inlet valve for admitting said gas to the opposite end of said cylinder, and means for holding said inlet valve open when said exhaust port is open whereby said engine may be defrosted by warm gas flowing through said exhaust port and said inlet valve from one end to the other end of said cylinder.

6. An expansion engine for expanding a compressed gas from an initial pressure and a temperature below atmospheric temperature to an exhaust pressure and a still lower temperature, including a crank case for housing a crank-connecting rod and valve operating mechanism, a vertical cylinder, insulation surrounding said cylinder, standards attached to said crank case and to said cylinder at one end, supporting said cylinder at a distance from said crank case, an inlet valve for controlling flow of the compressed gas into said cylinder at the end opposite to the end at which said standards are attached, a rod for opening said inlet valve operated by the mechanism within said crank case, and a sleeve surrounding said rod fastened to said cylinder adjacent to said valve extending through said insulation and braced to said standards at points distant from said cylinder, whereby heat leak along said rod and said sleeve is reduced to a relatively small amount.

7. An expansion engine for expanding a compressed gas from an initial pressure and a temperature below atmospheric temperature to an exhaust pressure and a still lower temperature as in claim 6 wherein the braces between said sleeve and said standards are outside of said insulation.

8. An expansion engine for expanding a compressed gas from an initial pressure and a temperature below atmospheric temperature to an exhaust pressure and a still lower temperature as in claim 6, wherein the rod for operating said inlet valve is separate from said inlet valve and is not in metallic contact with said inlet valve during the period said inlet valve is closed, whereby heat leak along said rod is further reduced.

9. An expansion engine with cylinder and reciprocating piston therein for expanding a gas from an initial pressure to an exhaust pressure on one side only of said piston, means for subjecting the other side of said piston to said exhaust pressure, a piston rod projecting from the exhaust side of said piston, a stuffing box with packing material surrounding said piston rod, an inlet valve for admitting gas at the initial pressure to said cylinder, a valve rod for opening said inlet valve, a sleeve surrounding said valve rod, means for supplying dry gas under pressure to an intermediate point in said sleeve and means for supplying dry gas under reduced pressure to an intermediate point in said packing material, whereby leakage of cold gas is prevented along said valve rod and said piston rod.

10. An expansion engine with cylinder and reciprocating piston therein for expanding a gas on one side only of said piston, from an initial pressure and a temperature below atmospheric temperature to an exhaust pressure and a still lower temperature, means for subjecting the other side of said piston to the expanded gas at the exhaust pressure and a temperature below atmospheric temperature, a piston rod projecting from the exhaust side of said piston, a stuffing box with packing material surrounding said piston rod, and means for supplying dry gas at about atmospheric temperature and under pressure to an intermediate point in said packing material, whereby leakage of cold gas is prevented along said piston rod and said packing material is maintained at about atmospheric temperature.

11. In a valve for controlling flow of cold gas at very low temperatures including a long stem extending from the valve body at very low temperatures to an operating handle at room temperature, a tube surrounding said stem, threads on said stem engaging threads within said tube for moving said stem longitudinally by rotating said operating handle, and a stuffing box in said tube filled with packing material surrounding said stem for preventing leakage of cold gas along said stem, that step of supplying dry gas under pressure and at about atmospheric temperature to the annular space between said tube and said stem and intermediate to said threads and said packing material whereby leakage of cold gas is prevented along said stem, and said packing materials and said threads are maintained about atmospheric temperature.

12. An expansion engine with cylinder and reciprocating piston therein for expanding a gas from an initial pressure to an exhaust pressure, an inlet valve for admitting gas at the initial pressure to said cylinder, a valve rod for opening said inlet valve, a sleeve surrounding said valve rod, and means for supplying dry gas under pressure to an intermediate point in said sleeve, whereby leakage of cold gas is prevented along said valve rod.

13. An expansion engine with cylinder for expanding low temperature gas from an initial pressure to an exhaust pressure, said cylinder being surrounded by insulation and spaced from a crank case inclosing mechanism at room temperature, an operating rod extending from said cylinder through said insulation to a mechanism within said crank case, a casing surrounding said operating rod between said insulation and said crank case, a sleeve around said operating rod, and means for supplying dry gas under pressure to an intermediate point in said sleeve whereby leakage of cold gas from said cylinder along said operating rod is prevented and said dry gas leaks through said sleeve into the space within said casing excluding atmospheric air therefrom.

14. An expansion engine for expanding a gas from an initial pressure and a temperature below atmospheric temperature to an exhaust pressure and a still lower temperature including a mechanism subjected to said low temperature gas, insulation surrounding said mechanism, an operating rod extending from said mechanism through said insulation to a point at atmospheric temperature without said insulation, a sleeve surrounding said operating rod, and means for supplying dry gas about atmospheric temperature and under pressure to an intermediate point in said sleeve whereby leakage of low temperature gas is prevented along said operating rod and said sleeve is maintained about atmospheric temperature.

15. An operating rod extending from a mechanism below atmospheric temperature within insulation to a point at atmospheric temperature without the insulation, a sleeve surrounding said operating rod, means for supplying dry gas under pressure to an intermediate point in said sleeve, and means for heating said dry gas, whereby said sleeve is maintained at or about atmospheric temperature and leakage of cold gas is prevented along said operating rod.

16. An expansion engine with cylinder for expanding low temperature gas from an initial pressure to an exhaust pressure, said cylinder being surrounded by insulation and spaced from a crank case inclosing mechanism at room temperature, an operating rod extending from said cylinder through said insulation to a mechanism within said crank case, a casing surrounding said operating rod between said insulation and said crank case, packing material around said operating rod, and means for supplying dry gas under pressure to an intermediate point in said packing material, whereby leakage of cold gas from said cylinder along said operating rod is prevented and said dry gas leaks through said packing material into the space within said casing excluding atmospheric air therefrom.

17. An operating rod extending from a mechanism below atmospheric temperature within insulation to a point at atmospheric temperature without the insulation, packing material surrounding said operating rod, means for supplying dry gas under pressure to an intermediate point in said packing material, and means for heating said dry gas, whereby said packing material is maintained about atmospheric temperature and leakage of cold gas is prevented along said operating rod.

18. An expansion engine for expanding a gas from an initial pressure and a temperature below atmospheric temperature to an exhaust pressure and a still lower temperature including a mechanism subjected to said low temperature gas, insulation surrounding said mechanism, an operating rod extending from said mechanism through said insulation to a point at atmospheric temperature without said insulation, packing material surrounding said operating rod, and means for supplying dry gas about atmospheric temperature and under pressure to an intermediate point in said packing material whereby leakage of low temperature gas is prevented along said operating rod and said packing material is maintained about atmospheric temperature.

WILLIAM LANE DE BAUFRE.
THEODORE ANTON FILIPI.

April 29, 1941.  L. J. DEELEY  2,239,884
VARIABLE PUSH ROD FOR DIESEL INJECTORS
Filed April 23, 1940
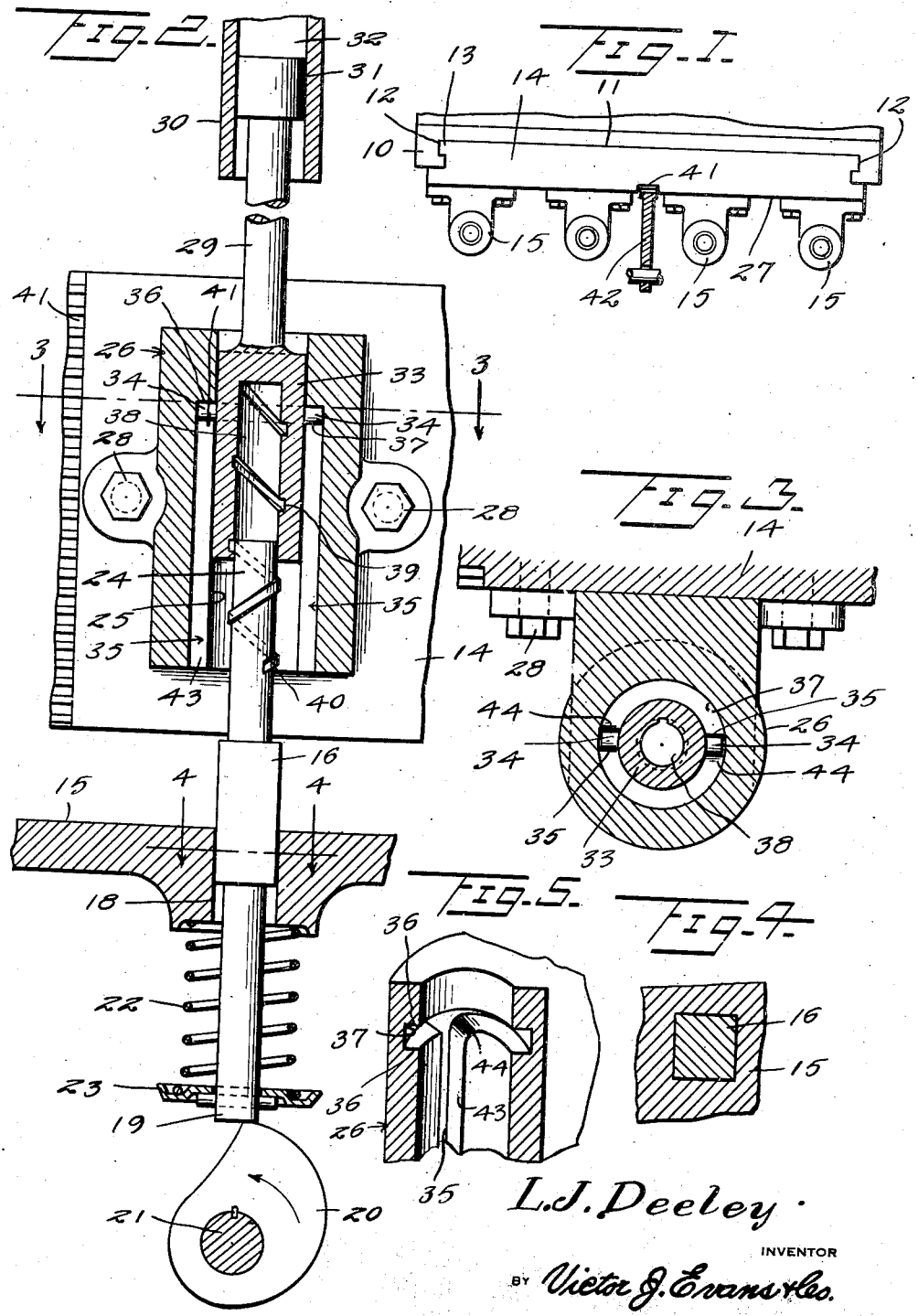
L. J. Deeley
INVENTOR
BY Victor J. Evans & Co.
ATTORNEYS